United States Patent
Ueda et al.

(10) Patent No.: US 11,137,988 B2
(45) Date of Patent: Oct. 5, 2021

(54) PROGRAM CODE GENERATION DEVICE AND COMPUTER READABLE MEDIUM

(71) Applicant: MITSUBISHI ELECTRIC CORPORATION, Tokyo (JP)

(72) Inventors: Takeshi Ueda, Tokyo (JP); Koichi Shimizu, Tokyo (JP); Shoei Nashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/500,483

(22) PCT Filed: Jun. 2, 2017

(86) PCT No.: PCT/JP2017/020664
§ 371 (c)(1),
(2) Date: Oct. 3, 2019

(87) PCT Pub. No.: WO2018/220836
PCT Pub. Date: Dec. 6, 2018

(65) Prior Publication Data
US 2021/0109723 A1    Apr. 15, 2021

(51) Int. Cl.
G06F 8/41    (2018.01)
G06F 8/35    (2018.01)

(52) U.S. Cl.
CPC .............. *G06F 8/433* (2013.01); *G06F 8/35* (2013.01)

(58) Field of Classification Search
CPC .................. G06F 8/433; G06F 8/35
(Continued)

(56) References Cited

U.S. PATENT DOCUMENTS 5,187,788 A * 2/1993 Marmelstein ............. G06F 8/34
   717/109
5,280,617 A * 1/1994 Brender .................. G06F 8/447
   717/159

(Continued)

FOREIGN PATENT DOCUMENTS

CN    1908892 A    2/2007
CN  105531672 A    4/2016
(Continued)

OTHER PUBLICATIONS

Moha, Naouel, et al. "Decor: A method for the specification and detection of code and design smells." IEEE Transactions on Software Engineering 36.1 (2009): pp. 20-36. (Year: 2009).*

(Continued)

*Primary Examiner* — Satish Rampuria
(74) *Attorney, Agent, or Firm* — Birch, Stewart, Kolasch & Birch, LLP

(57) ABSTRACT

A branch element identification unit identifies a branch element being a program element for branching, from a model diagram representing a plurality of program elements and a relationship among the program elements. A group identification unit identifies a branch destination group, the branch destination group being a series of program elements constituting branch destination of the branch element, for each branch destination from the model diagram. A sequence determination unit determines a sequence of the branch destination groups in a program code. A code generation unit generates the program code based on the model diagram. The program code includes codes corresponding to the branch destination groups in accordance with the sequence of the branch destination groups.

18 Claims, 10 Drawing Sheets

(58) Field of Classification Search
USPC .................................. 717/104–113, 136–161
See application file for complete search history.

(56) References Cited

U.S. PATENT DOCUMENTS

| | | | | |
|---|---|---|---|---|
| 5,452,453 | A * | 9/1995 | Ando | G06N 5/046 717/104 |
| 5,511,198 | A * | 4/1996 | Hotta | G06F 8/445 717/146 |
| 6,996,799 | B1 * | 2/2006 | Cismas | G06F 30/30 717/106 |
| 2006/0020949 | A1 | 1/2006 | Hoshino et al. | |
| 2012/0192169 | A1 | 7/2012 | Li et al. | |
| 2015/0019576 | A1 | 1/2015 | Seneski et al. | |

FOREIGN PATENT DOCUMENTS

| | | |
|---|---|---|
| JP | 2006-12017 A | 1/2006 |
| JP | 2006-301989 A | 11/2006 |
| JP | 2008-64262 A | 4/2008 |
| JP | 2008-140288 A | 6/2008 |
| JP | 2011-13887 A | 1/2011 |
| JP | 2012-150811 A | 8/2012 |
| JP | 2016-57715 A | 4/2016 |
| WO | WO 2015/087409 A1 | 6/2015 |

OTHER PUBLICATIONS

Goldsby, Heather J., et al. "Goal-based modeling of dynamically adaptive system requirements." IEEE, 2008. pp. 36-45 (Year: 2008).*
Burnard, Andrew, and Land Rover. "Verifying and validating automatically generated code." Proc. of International Automotive Conference (IAC). 2004.pp. 71-78 (Year: 2004).*
Buck, Joseph T. "Static scheduling and code generation from dynamic dataflow graphs with integer-valued control streams." Proceedings of 1994 28th Asilomar Conference on Signals, Systems and Computers. vol. 1. IEEE, 1994.pp. 508-513 (Year: 1994).*
Allegrini, Tiziana. "Code generation starting from statecharts specified in UML." Universita Degli Studi di Pisa (2002).pp. 1-119 (Year: 2002).*
Niaz, Iftikhar Azim, and Jiro Tanaka. "Code generation from UML statecharts." Proc. 7 th IASTED International Conf. on Software Engineering and Application (SEA 2003), Marina Del Rey. 2003.pp. 315-321 (Year: 2003).*
European Communication pursuant to Art. 94(3) EPC for European Application No. 17 911 723.9 dated Nov. 10, 2020.
Taiwan Office Action for application No. 106123305 dated Oct. 22, 2018.
International Search Report (PCT/ISA/210) issued in PCT/JP2017/020664, dated Aug. 15, 2017.
Extended European Search Report issued in corresponding European Application No. 17911723.9 dated May 6, 2020.
European Communication pursuant to Art. 94(3) EPC for European Application No. 17 911 723.9 dated May 14, 2021.

* cited by examiner

210:BRANCH ELEMENT RULE

| PROCESSING TYPE | RULE VALUE |
|---|---|
| START | 0 |
| END | 0 |
| ACTION | 0 |
| BEHAVIOR CALL | 0 |
| DECISION | 1 |
| DATA | 0 |

Fig. 9

221: GENERAL CONVERSION RULE 

| ITEM | CONVERSION RULE |
|---|---|
| HEADER FILE NAME | FILE NAME (EXCEPT EXTENSION) OF MODEL DIAGRAM .h |
| SOURCE FILE NAME | FILE NAME (EXCEPT EXTENSION) OF MODEL DIAGRAM .c |
| FUNCTION NAME | FILE NAME (EXCEPT EXTENSION) OF MODEL DIAGRAM |
| VARIABLE NAME | NAME OF DATA BLOCK |

Fig. 10

222: BLOCK CONVERSION RULE 

| TYPE | CONVERSION RULE |
|---|---|
| START | FUNCTION IS STARTED |
| END | FUNCTION IS ENDED BY return |
| ACTION | DESCRIPTION OF CODE INDICATED BY CONTENTS |
| BEHAVIOR CALL | CALL FOR FUNCTION INDICATED BY CONTENTS |
| DECISION | BRANCH CONDITION INDICATED BY CONTENTS BECOMES CONDITIONAL STATEMENT |
| DATA | VARIABLE IS REPRESENTED |
| OTHERS | IF LOOP STRUCTURE EXISTS, for STATEMENT IS USED |

Fig.11

223:BEHAVIOR CONVERSION RULE

| NAME | HEADER | RETURN VALUE | ARGUMENT |
|---|---|---|---|
| AuthUser | util.h | int | char [] user, char [] password |
| ExecProgram | common.h | int | char [] command |

Fig. 12

230:HEADER FILE

```
#ifndef _EXEC_BACKUP_H_
define _EXEC_BACKUP_H_ extern int ExecBackup(int argc, char *argv[]);

endif
```
231

240: SOURCE FILE    241

```
#include <stdio.h>
#include "common.h"
#include "util.h"

int ExccBackup(int argc, char * argv[])
{
    char *user_id = argv[0];
    char *password = argv[1];

int result = AuthUser(user_id, password);

if (result != 1) {
        printf("Invalid User.¥n");
        return 1;
    } else {
        printf("Start backup");
        ExecProgram("backup.exe");
        return 0;
    }
}
```

PROGRAM CODE GENERATION DEVICE AND COMPUTER READABLE MEDIUM

TECHNICAL FIELD

The present invention relates to a technique for automatic generation of a program code.

BACKGROUND ART

There is a method by which a program code such as a source code is automatically generated based on program specifications prepared in advance.

For instance, there is a method in which a program code is generated based on a model diagram representing program specifications. The model diagram is composed of a plurality of blocks and connection lines that make connections among the blocks. An element of a processing procedure is defined in each of the blocks. Specifically, a batch of data processing is defined in each of the blocks. In the model diagram, a processing procedure from acquisition of an input value by a program to output of an output value by the program or a processing procedure from reception of an event by the program to completion of a process corresponding to the event by the program is described. A control structure is also described in the model diagram.

Patent Literature 1 discloses a technique of generating a program code from a model diagram.

In the technique disclosed in Patent Literature 1, a value is set in advance for each block of the model diagram and a developer selects a property (such as a code size or a speed) that is to be of importance in generation of the program code at time of the generation, so that program codes different in properties may be outputted from the same model diagram.

Patent Literature 2 and Patent Literature 3 disclose techniques in which a model diagram is compared with a pattern of an inappropriate block diagram and in which notification that the model diagram is inappropriate is made when the model diagram coincides with the pattern of the inappropriate model diagram.

CITATION LIST

Patent Literature

Patent Literature 1: JP 2006-301989
Patent Literature 2: JP 2011-13887
Patent Literature 3: JP 2016-57715

SUMMARY OF INVENTION

Technical Problem

There have been fault injection attacks that are attacks on hardware.

The fault injection attack is an attack in which a physical stimulus or the like is given to the hardware in order that a deliberate failure may be caused. The fault injection attack makes it possible to make an attack that avoids security measures implemented by software. Specifically, the fault injection attack causes a skip over a program instruction. Thus a control flow of a program is changed so that the security measures may be avoided.

Fundamentally, the fault injection attacks cannot be avoided only by implementation of software.

Even if the control flow has been changed, however, it is necessary to avert the worst.

In any of the techniques disclosed in Patent Literature 1, Patent Literature 2, and Patent Literature 3, the control flow represented by the model diagram is not taken into consideration. Therefore, it is thought that the program codes generated based on the techniques are vulnerable to the fault injection attacks.

The present invention aims at enabling generation of a program code that may be invulnerable to the fault injection attacks.

Solution to Problem

A program code generation device to generate a program code, the program code generation device according to the present invention includes:
  a branch element identification unit to identify a branch element being a program element for branching, from a model diagram representing a plurality of program elements and a relationship among the program elements;
  a group identification unit to identify a branch destination group, the branch destination group being a series of program elements constituting branch destination of the branch element, for each branch destination from the model diagram; and
  a sequence determination unit to determine a sequence of the branch destination groups in the program code.

Advantageous Effects of Invention

According to the invention, the sequence of the branch destination groups in the program code may be determined. As a result, the program code including codes corresponding to the branch destination groups in accordance with the determined sequence may be generated. Therefore, generation of the program code that may be invulnerable to the fault injection attacks may be enabled.

BRIEF DESCRIPTION OF DRAWINGS

FIG. 9 is a diagram illustrating a specific example of a general conversion rule 221 in Embodiment 1.

FIG. 10 is a diagram illustrating a specific example of a block conversion rule 222 in Embodiment 1.

FIG. 11 is a diagram illustrating a specific example of a behavior conversion rule 223 in Embodiment 1.

FIG. 12 is a diagram illustrating a specific example of a header file 230 in Embodiment 1.

DESCRIPTION OF EMBODIMENTS

Figure 1:
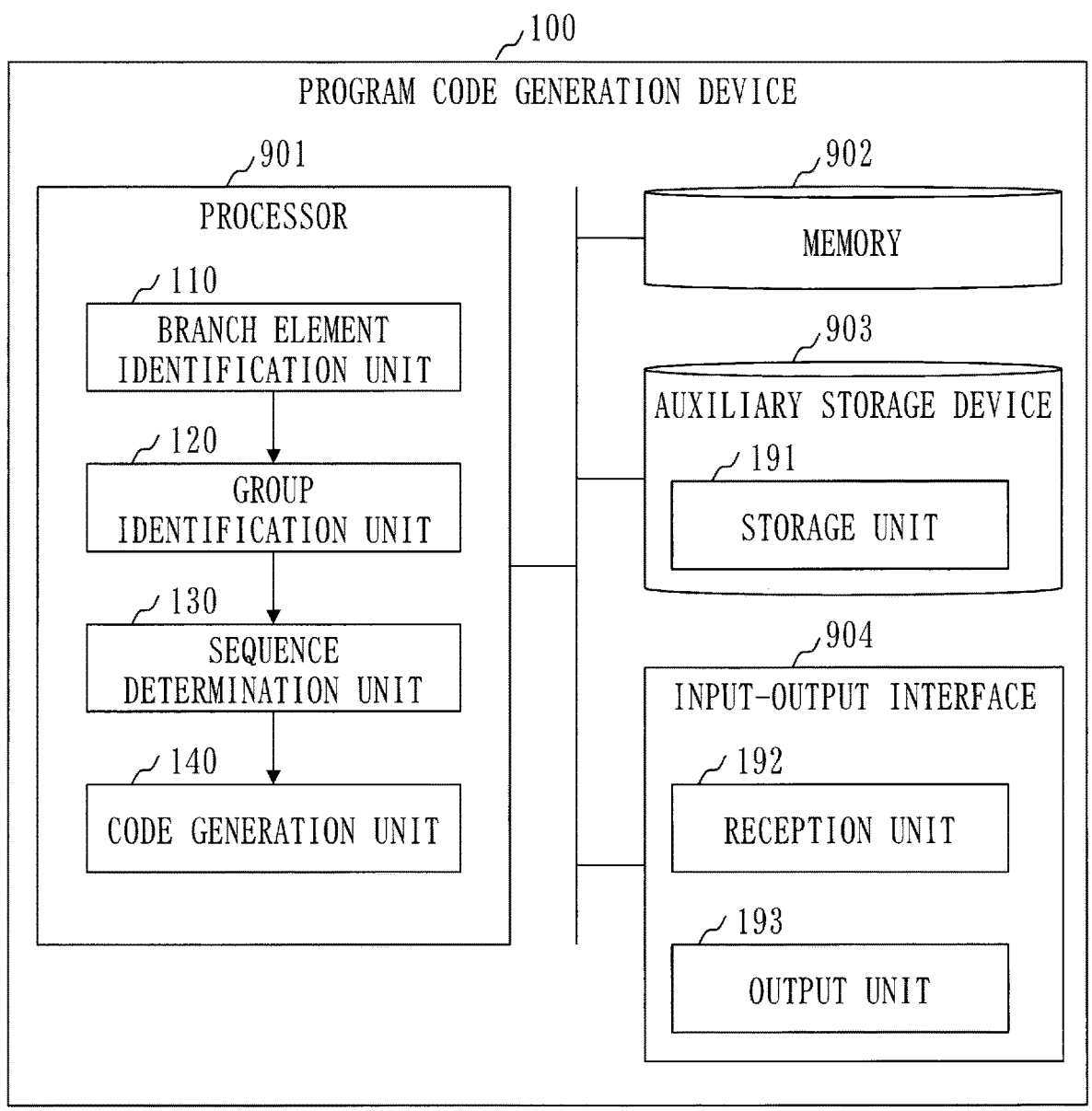
FIG. 1 is a configuration diagram of a program code generation device 100 in Embodiment 1.

In embodiments and the drawings, identical elements and corresponding elements are provided with identical reference characters. Description of the elements provided with the identical reference characters is omitted or simplified appropriately. Arrows in the drawings mainly designate flow of data or flow of processes.

Embodiment 1

An embodiment in which a program code is automatically generated will be described based on FIGS. 1 to 13.

\*\*\*Description of Configuration\*\*\*

Based on FIG. 1, a configuration of a program code generation device 100 will be described.

The program code generation device 100 is a computer that includes hardware such as a processor 901, a memory 902, an auxiliary storage device 903, and an input-output interface 904. The hardware is mutually connected through signal lines.

The processor 901 is an integrated circuit (IC) to carry out arithmetic processing and controls the other hardware. The processor 901 is a central processing unit (CPU), a digital signal processor (DSP), or a graphics processing unit (GPU), for instance.

The memory 902 is a volatile storage device. The memory 902 may be referred to as a main storage or a main memory. The memory 902 is a random access memory (RAM), for instance. Data stored in the memory 902 is saved in the auxiliary storage device 903 as appropriate.

The auxiliary storage device 903 is a nonvolatile storage device. The auxiliary storage device 903 is a read only memory (ROM), an hard disk drive (HDD), or a flash memory, for instance. Data stored in the auxiliary storage device 903 is loaded into the memory 902 as appropriate.

The input-output interface 904 is a port to which input devices and an output device are to be connected. The input-output interface 904 is a USB terminal, the input devices are a keyboard and a mouse, and the output device is a display, for instance. USB is an abbreviation for Universal Serial Bus.

The program code generation device 100 includes software elements such as a branch element identification unit 110, a group identification unit 120, a sequence determination unit 130, and a code generation unit 140. The software elements are elements implemented by software.

In the auxiliary storage device 903, a program code generation program to make the computer function as the branch element identification unit 110, the group identification unit 120, the sequence determination unit 130, and the code generation unit 140 is stored. The program code generation program is loaded into the memory 902 and is then executed by the processor 901.

In addition, an operating system (OS) is stored in the auxiliary storage device 903. At least a portion of the OS is loaded into the memory 902 and is then executed by the processor 901.

That is, the processor 901 executes the program code generation program while executing the OS.

Data obtained through execution of the program code generation program is stored in a storage device such as the memory 902, the auxiliary storage device 903, a register in the processor 901, or a cache memory in the processor 901.

The auxiliary storage device 903 functions as a storage unit 191 to store data. In place of or in cooperation with the auxiliary storage device 903, however, another storage device may function as the storage unit 191.

The input-output interface 904 functions as a reception unit 192 to receive input of data. In addition, the input-output interface 904 functions as an output unit 193 to output data.

The program code generation device 100 may include a plurality of processors to substitute for the processor 901. Roles of the processor 901 are divided among the plurality of processors.

The program code generation program may be computer-readably stored in a non-volatile storage medium such as a magnetic disc, an optical disc, or a flash memory. The non-volatile storage medium is a non-transitory tangible medium.

\*\*\*Description of Operation\*\*\*

Operation of the program code generation device 100 is equivalent to a program code generation method. A procedure of the program code generation method is equivalent to a procedure of the program code generation program.

Based on FIG. 2, the program code generation method will be described.

In step S110, the reception unit 192 receives a model diagram 200. The storage unit 191 stores the received model diagram 200 in the storage unit 191.

Specifically, a user inputs the model diagram 200 into the program code generation device 100 and the reception unit 192 receives the model diagram 200 inputted into the program code generation device 100. The storage unit 191 stores the received model diagram 200.

The model diagram 200 is data representing specifications of an execution program and illustrates a plurality of program elements and relationships among the program elements.

The program elements are elements, such as input-output data, control, and processes, constituting the execution program.

Figure 3:
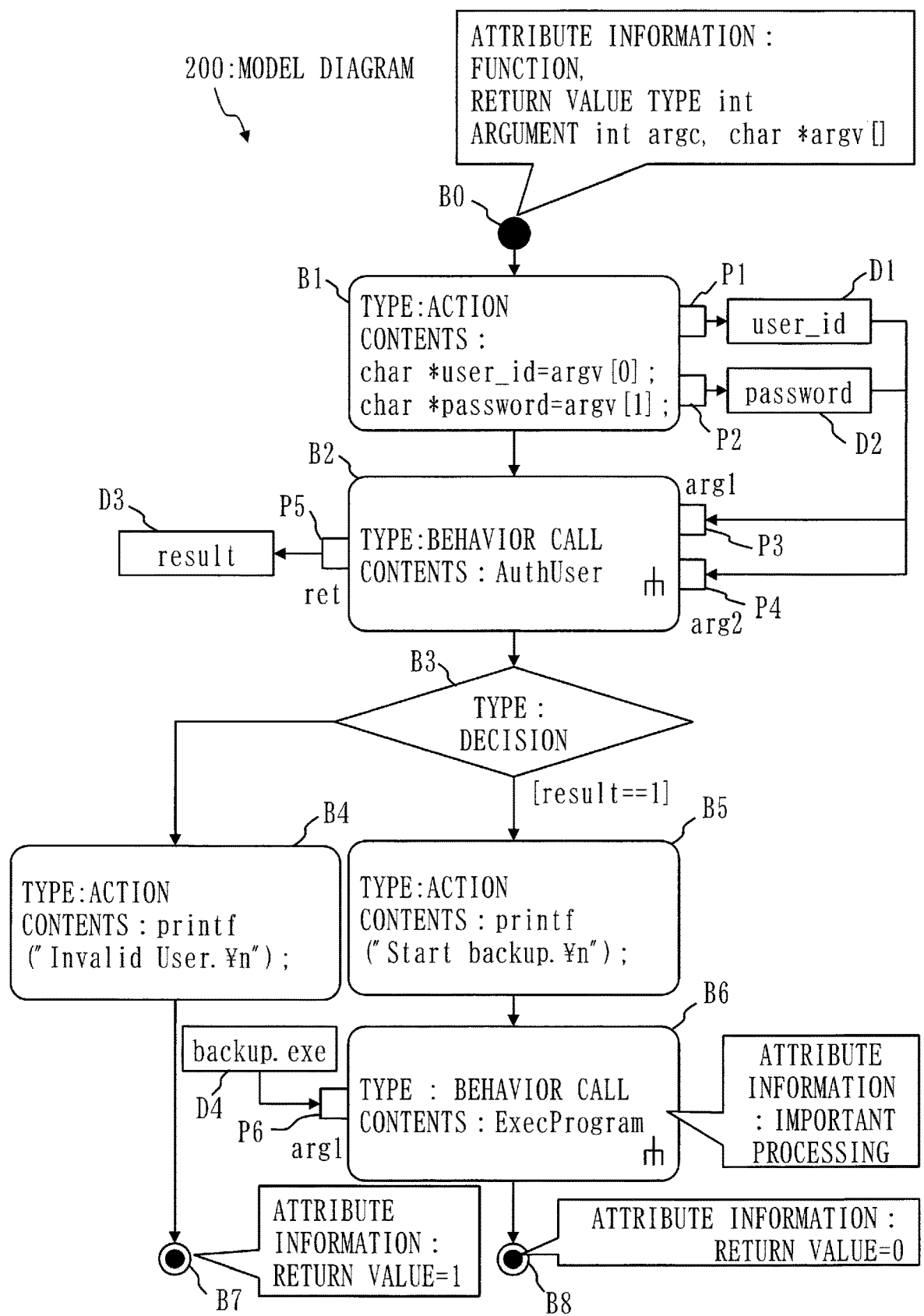
FIG. 3 is a diagram illustrating a specific example of a model diagram 200 in Embodiment 1.

A specific example of the model diagram 200 is illustrated in FIG. 3.

The model diagram 200 includes a plurality of processing blocks (B0 to B8), a plurality of data blocks (D1 to D4), and a plurality of pins (P1 to P6). In addition, the model diagram 200 includes connection lines to connect the processing blocks, the data blocks, and the pins with one another.

The processing blocks are the program elements representing data processing or control processing.

The data blocks are the program elements representing the input-output data.

The pins are the program elements representing attributes of the input-output data.

The connection lines are directed lines representing the relationships among the program elements. In FIG. 3, the arrows are used as the connection lines and directions of the arrows represent flow of the procedure or the data.

An ID (Identifier) and a name are set for each of the program elements. The ID is used in processes of the program code generation method. The name is presented to the user. Reference characters (B0 to B8, D1 to D4, and P1 to P6) provided for the program elements are equivalent to the IDs of the program elements.

Internal data such as types, contents, attribute information, and comments is set for the processing blocks (B0 to B8).

Based on the types of the processing blocks, types of the data processing or the control processing may be identified.

Among the types are start, end, behavior call, action, and decision, for instance.

As the types of the processing blocks, the start means a start of the procedure and the end means an end of the procedure.

The behavior call means a call for behavior. The behavior is predetermined processing and is implemented by one or more instructions. Specifically, the behavior is equivalent to a function.

The action means execution of the data processing.

The decision means execution of the control processing.

The type of the processing block B0 is the start. That is, the processing block B0 represents the start of the procedure.

The attribute information of the processing block B0 indicates that the procedure starting from the processing block B0 is the procedure of a function.

The attribute information of the processing block B0 further indicates "function", return value type "int", and argument "int argc, char*argv[ ]". The "function" means that the procedure starting from the processing block B0 is the procedure of the function.

The type of the processing block B1 is the action. That is, the processing block B represents the data processing. The contents of the processing block B1 indicate specific data processing.

The type of the processing block B2 is the behavior call. The contents of the processing block B2 indicate a behavior name "AuthUser". That is, the processing block B2 represents a call for behavior named AuthUser.

The type of the processing block B3 is the decision. The contents of the processing block B3 indicate a branch condition "result==1" and two branch destinations "B5" and "B4". That is, the processing block B3 represents branch control. The branch destination in case where the branch condition "result==1" is satisfied is the processing block B5 and the branch destination in case where the branch condition "result==1" is not satisfied is the processing block B4.

The type of the processing block B4 is the action. That is, the processing block B4 represents the data processing. The contents of the processing block B4 indicate specific data processing.

The type of the processing block B5 is the action. That is, the processing block B5 represents the data processing. The contents of the processing block B5 indicate specific data processing.

The type of the processing block B6 is the behavior call. The contents of the processing block B6 indicate a behavior name "ExecProgram". That is, the processing block B6 represents a call for behavior named ExecProgram.

The attribute information of the processing block B6 indicates an important attribute "important processing". That is, the processing block B6 is an important processing block. The important processing block is a program element representing important processing.

The type of the processing block B7 is the end. That is, the processing block B7 represents the end of the procedure.

The attribute information of the processing block B7 indicates a return value "1".

The type of the processing block B8 is the end. That is, the processing block B8 represents the end of the procedure.

The attribute information of the processing block B8 indicates a return value "0".

Data names, that is, variable names are set for the data blocks (D1 to D4).

The data block D1 represents data "user_id" that is outputted from the processing block B1 and that is inputted into the processing block B2.

The data block D2 represents data "password" that is outputted from the processing block B1 and that is inputted into the processing block B2.

The data block D3 represents data "result" that is outputted from the processing block B2.

The data block D4 represents data "backup.exe" that is inputted into the processing block B6.

Data attributes are set for the pins (P1 to P6) as appropriate. In FIG. 3, "arg" means argument and "ret" means return value.

The pin P3 indicates that the data "user_id" is a first argument for the behavior "AuthUser".

The pin P4 indicates that the data "password" is a second argument for the behavior "AuthUser".

The pin P5 indicates that the data "result" is a return value from the behavior "AuthUser".

The pin P6 indicates that the data "backup.exe" is a first argument for the behavior "ExecProgram".

The model diagram 200 is described in a data format in which a hierarchical structure may be expressed.

For instance, the model diagram 200 is described in the data format such as XML or JSON. XML is an abbreviation for Extensible Markup Language. JSON is an abbreviation for JavaScript Object Notation. JavaScript is a registered trademark.

With return to FIG. 2, step S20 will be described.

In step S120, the branch element identification unit 110 identifies a branch element from the model diagram 200.

The branch element is a program element for branching. The program element for branching is a program element representing the branch control. The branch element is a program element that is equivalent to if statement and else statement in C language, for instance.

Specifically, the branch element identification unit 110 identifies the branch element based on the type of each program element.

The branch element identification unit 110 uses a branch element rule 210 in order to identify the branch element. The branch element rule 210 is a rule that specifies types of branch elements and has been stored in the storage unit 191 in advance.

The branch element identification unit 110 determines that a program element which falls under a type specified by the branch element rule 210 is the branch element.

Figure 4:
FIG. 4 is a diagram illustrating a specific example of a branch element rule 210 in Embodiment 1.

In FIG. 4, a specific example of the branch element rule 210 is illustrated.

The branch element rule 210 has columns for processing type and rule value. The columns are made to correspond to each other.

The column for processing type indicates the types of the processing. The types of the processing represent the types of the processing blocks.

The column for rule value indicates whether each type of the processing is a type with branch or not. The type with branch refers to a type of a processing block that falls under the branch element. The rule value "1" means that the type of the processing is the type with branch and the rule value "0" means that the type of the processing is not the type with branch.

In FIG. 4, the type with branch is the "decision".

Therefore, the branch element identification unit 110 determines that a processing block for which the type "decision" is set is the branch element.

Branch processing may be carried out in a processing block that falls under "action" or "behavior call". Then a parser is required in order to analyze a description in the processing block that falls under "action". In addition, a model diagram for behavior that is called from the processing block that falls under "behavior call" is required. In relation to the embodiment, description of the parser and the model diagram for behavior is omitted.

The branch element rule 210 may be described in either of a natural language and a programming language.

With return to FIG. 2, description of step S120 will be continued.

The group identification unit 120 identifies a branch destination group for each branch destination of the branch element, from the model diagram 200. The branch destination group refers to a series of program elements that constitute the branch destination.

Figure 5:
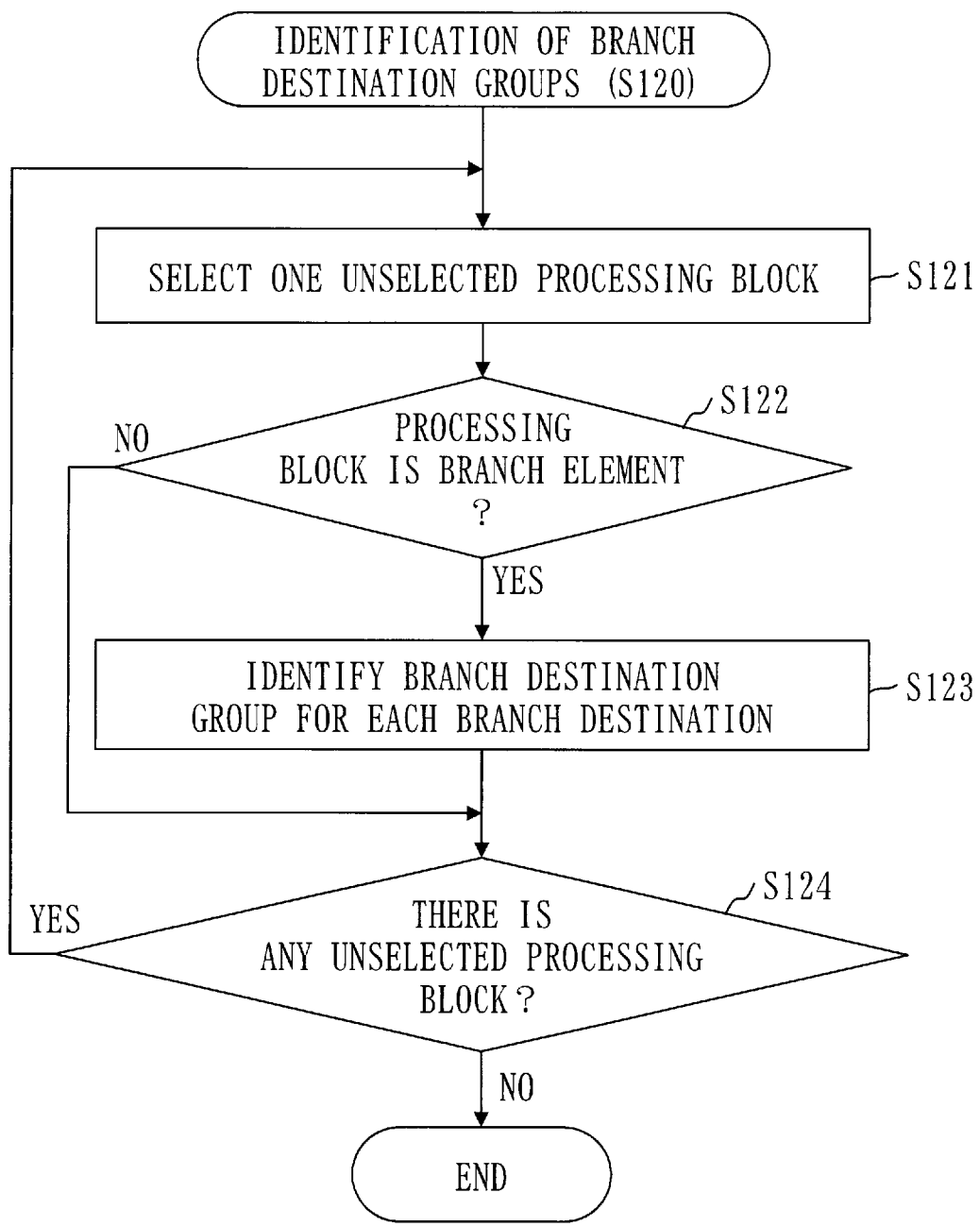
FIG. 5 is a flowchart illustrating identification of branch destination groups (S120) in Embodiment 1.

Based on FIG. 5, identification of the branch destination groups (S120) will be described.

In step S121, the branch element identification unit 110 selects one unselected processing block from the model diagram 200.

Specifically, the branch element identification unit 110 selects processing blocks one by one while tracing the connection lines from the processing block of the start to the processing block of the end.

In step S122, the branch element identification unit 110 determines whether the selected processing block is the branch element or not.

Specifically, the branch element identification unit 110 operates as follows.

Initially, the branch element identification unit 110 retrieves the type from the selected processing block.

Subsequently, the branch element identification unit 110 selects the same processing type as the retrieved type, from the branch element rule 210.

Subsequently, the branch element identification unit 110 retrieves a rule value that is made to correspond to the selected processing type, from the branch element rule 210.

Then the branch element identification unit 110 determines whether the retrieved rule value is 1 or not.

In case where the retrieved rule value is 1, the selected processing block is the branch element.

In case where the selected processing block is the branch element, the processing proceeds to step S123.

In case where the selected processing block is not the branch element, the processing proceeds to step S124.

In step S123, the group identification unit 120 identifies the branch destination group for each branch destination of the branch element.

Specifically, the group identification unit 120 identifies the series of program elements while tracing the connection lines from each branch destination of the branch element.

In the model diagram 200 of FIG. 3, the branch element is the processing block B3.

The branch destinations of the processing block B3 are the processing block B5 and the processing block B4.

The series of program elements acquired by tracing of the connection lines from the processing block B5 are the processing block B5, the processing block B6, and the processing block B8. Therefore, the group identification unit 120 identifies a set of the processing block B5, the processing block B6, and the processing block B8 as a first branch destination group.

The series of program elements acquired by tracing of the connection lines from the processing block B4 are the processing block B4 and the processing block B7. Therefore, the group identification unit 120 identifies a set of the processing block B4 and the processing block B7 as a second branch destination group.

With return to FIG. 5, description of step S123 will be continued.

The group identification unit 120 generates branch information and the storage unit 191 stores the branch information.

The branch information is information for identification of the branch element and the branch destination groups. Specifically, the information for the identification of the branch element is an ID of the branch element and the information for the identification of the branch destination group is the IDs of the program elements that constitute the branch destination group.

Subsequently, step S124 will be described.

In step S124, the branch element identification unit 110 determines whether there is any unselected processing block or not.

In case where there is any unselected processing block, the processing proceeds to step S121.

In case where there is no unselected processing block, the identification of the branch destination groups (S120) is ended.

Through the identification of the branch destination groups (S120), the branch information is generated for each branch element and each branch information is stored in the storage unit 191.

With return to FIG. 2, the description will be continued from step S130.

In step S130, the sequence determination unit 130 determines whether the branch destination groups have been identified from the model diagram 200 or not.

Specifically, the sequence determination unit 130 determines whether at least one branch information is stored in the storage unit 191 or not. In case where at least one branch information is stored in the storage unit 191, the sequence determination unit 130 determines that the branch destination groups have been identified from the model diagram 200.

In case where the branch destination groups have been identified from the model diagram 200, the processing proceeds to step S140.

In case where the branch destination groups have not been identified from the model diagram 200, the processing proceeds to step S150.

In step S140, the sequence determination unit 130 determines a sequence of the branch destination groups in the program code.

Specifically, the sequence determination unit 130 determines an importance level of each of the branch destination groups based on whether the branch destination group includes a program element having an important attribute or not. Then the sequence determination unit 130 determines the sequence of the branch destination groups based on the importance levels of the branch destination groups.

In case where the determined sequence differs from the sequence identified by the branch element, the sequence determination unit 130 modifies the branch element so as to bring about coincidence with the determined sequence.

Figure 6:
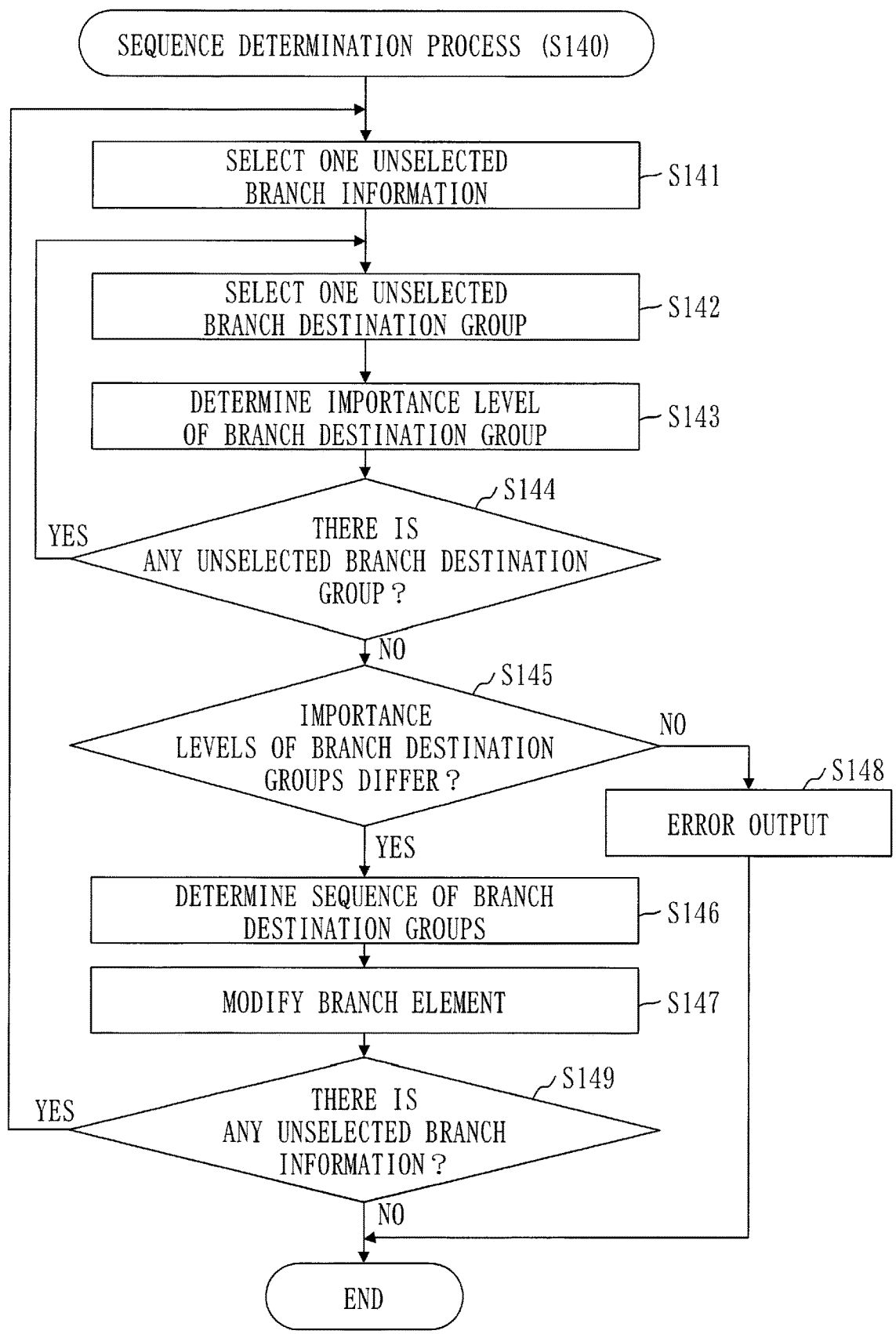
FIG. 6 is a flowchart illustrating a sequence determination process (S140) in Embodiment 1.

Based on FIG. 6, a procedure of a sequence determination process (S140) will be described.

In step S141, the sequence determination unit 130 selects one unselected branch information.

Processes from step S142 to step S148 are carried out for the branch information selected in step S141.

In step S142, the sequence determination unit 130 selects one unselected branch destination group from the selected branch information.

Step S143 and step S144 are carried out for the branch destination group selected in step S142.

In step S143, the sequence determination unit 130 determines the importance level of the selected branch destination group.

Specifically, the sequence determination unit 130 determines the importance level of the branch destination group as follows.

The sequence determination unit 130 determines whether any important element is included in the branch destination group or not. The important element is a program element for which the important attribute is set.

In case where any important element is included in the branch destination group, the sequence determination unit 130 counts a number of elements of the branch destination group. The number of the elements of the branch destination group is a number of the program elements included in the branch destination group. Specifically, the number of the elements of the branch destination group is a number of the processing blocks included in the branch destination group. The number of the elements of the branch destination group is used as the importance level of the branch destination group. In FIG. 3, the processing block B5, the processing block B6, and the processing block B8 constitute the first branch destination group. The first branch destination group includes the three processing blocks including the processing block B6 for which the important attribute "important processing" is set. Therefore, the importance level of the first branch destination group is "3".

In case where any important element is not included in the branch destination group, the sequence determination unit 130 sets the importance level of the branch destination group at lowest level. Specifically, the sequence determination unit 130 sets the importance level of the branch destination group at "0". In FIG. 3, the processing block B4 and the processing block B7 constitute the second branch destination group. The second branch destination group does not include any processing block for which the important attribute "important processing" is set. Therefore, the importance level of the second branch destination group is "0".

In step S144, the sequence determination unit 130 determines whether there is any unselected branch destination group or not.

In case where there is any unselected branch destination group, the processing proceeds to step S142.

In case where there is no unselected branch destination group, the processing proceeds to step S145.

In step S145, the sequence determination unit 130 determines whether the importance levels of the branch destination groups differ or not, based on a comparison among the importance levels of the branch destination groups.

The sequence determination unit 130, however, excludes the branch destination groups that do not include any important element. That is, the sequence determination unit 130 makes the comparison and the determination for the branch destination groups that include any important element.

In case where the importance levels of the branch destination groups differ, that is, in case where two or more branch destination groups having the same importance level do not exist, the processing proceeds to step S146.

In case where the importance levels of the branch destination groups do not differ, that is, in case where two or more branch destination groups having the same importance level exist, the processing proceeds to step S148.

In step S146, the sequence determination unit 130 determines the sequence of the branch destination groups based on the importance levels of the branch destination groups.

Specifically, the sequence determination unit 130 determines the sequence in ascending order of the importance level. In case where the importance level of the first branch destination group is "3" and where the importance level of the second branch destination group is "0", for instance, the sequence of the branch destination groups is "second branch destination group→first branch destination group".

Then the sequence determination unit 130 registers the sequence of the branch destination groups in the branch information.

In step S147, in case where the determined sequence differs from the sequence identified by the branch element, the sequence determination unit 130 modifies the branch element so as to bring about the coincidence with the determined sequence.

Specifically, the sequence determination unit 130 operates as follows.

Initially, the sequence determination unit 130 determines a sequence of the branch destinations based on the branch condition indicated by contents of the branch element and two or more branch destinations.

Subsequently, the sequence determination unit 130 compares the sequence of the branch destinations with the sequence of the branch destination groups.

In case where the sequence of the branch destinations differs from the sequence of the branch destination groups, the sequence determination unit 130 modifies the branch condition indicated by the contents of the branch element.

In the model diagram 200 of FIG. 3, the branch element is the processing block B3. The branch condition in the processing block B3 is "result==1", the branch destination in case where the branch condition is satisfied is the processing block B5, and the branch destination in case where the branch condition is not satisfied is the processing block B4. In this configuration, the sequence of the branch destinations is "B5→B4". In case where the sequence is desired to be modified into "B4→B5", the sequence determination unit 130 modifies the branch condition "result==1" into "result!=1".

In step S148, the sequence determination unit 130 generates an error message and the output unit 193 displays the error message on the display.

In case where two or more branch destination groups having the same importance level exist in relation to one branch element, the branch destination groups cannot be arranged in an appropriate sequence. Therefore, the error message is displayed.

After step S148, the sequence determination process (S140) is ended. In addition, a process posterior to the sequence determination process (S140) is not carried out. That is, no program code is generated.

In step S149, the sequence determination unit 130 determines whether there is any unselected branch information or not.

In case where there is any unselected branch information, the processing proceeds to step S141.

In case where there is no unselected branch information, the sequence determination process (S140) is ended.

With return to FIG. 2, step S150 will be described.

In step S150, the code generation unit 140 generates the program code based on the model diagram 200.

The program code includes codes corresponding to the branch destination groups in accordance with the sequence of the branch destination groups.

Figure 7:
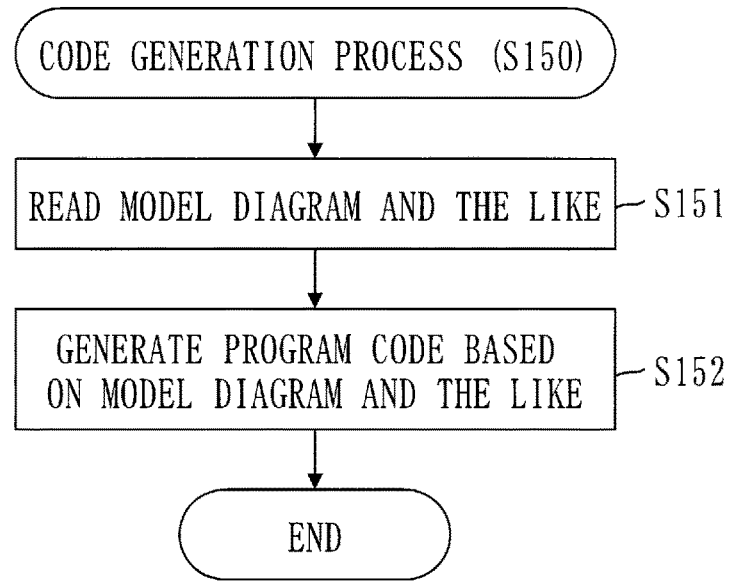
FIG. 7 is a flowchart illustrating a code generation process (S150) in Embodiment 1.

Based on FIG. 7, a code generation process (S150) will be described.

In step S151, the code generation unit 140 reads the model diagram 200, a code conversion rule 220, and the branch information from the storage unit 191.

The code conversion rule 220 is a rule for conversion of the model diagram 200 into the program code and has been stored in the storage unit 191 in advance.

Figure 8:
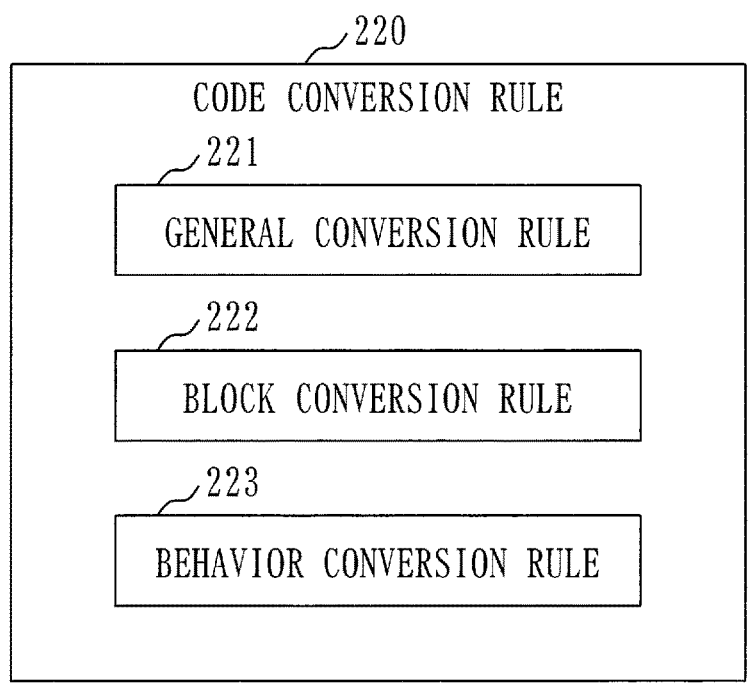
FIG. 8 is a configuration diagram of a code conversion rule 220 in Embodiment 1.

Based on FIG. 8, a configuration of the code conversion rule 220 will be described.

The code conversion rule 220 includes a general conversion rule 221, a block conversion rule 222, and a behavior conversion rule 223.

The general conversion rule 221 is a general rule of conversion that does not relate to expression of the model diagram 200.

The block conversion rule 222 is a rule of conversion that relates to the expression of the model diagram 200.

The behavior conversion rule 223 is a rule of conversion that relates to a function corresponding to the behavior.

In FIG. 9, a specific example of the general conversion rule 221 is illustrated.

The general conversion rule 221 has columns for item and conversion rule. The columns are made to correspond to each other.

The column for item specifies the program elements.

The column for conversion rule specifies names of the program elements.

For instance, the general conversion rule 221 specifies use of a file name (except extension) of the model diagram as a function name.

In FIG. 10, a specific example of the block conversion rule 222 is illustrated.

The block conversion rule 222 has columns for type and conversion rule. The columns are made to correspond to each other.

The column for type specifies the types of the processing blocks.

The column for conversion rule specifies methods of describing codes corresponding to the processing blocks.

For instance, the block conversion rule 222 specifies that the branch condition indicated in the contents of a processing block having the type "decision" should be a conditional statement. Specifically, a description of the branch condition is a conditional statement set in an if statement or a while statement.

In FIG. 11, a specific example of the behavior conversion rule 223 is described.

The behavior conversion rule 223 has columns for name, header, return value, and argument. The columns are made to correspond to one another.

The column for name specifies names of behavior.

The column for header specifies headers in which the functions corresponding to the behavior are defined.

The column for return value specifies return values of the functions corresponding to the behavior.

The column for argument specifies arguments of the functions corresponding to the behavior.

Contents of the general conversion rule 221, the block conversion rule 222, and the behavior conversion rule 223 may be described in either of a natural language and a programming language.

With return to FIG. 7, step S152 will be described.

In step S152, the code generation unit 140 generates the program code based on the model diagram 200, the code conversion rule 220, and the branch information. The program code is described with use of a programming language. The storage unit 191 stores the program code.

Specifically, the code generation unit 140 operates as follows.

Initially, the code generation unit 140 generates a header file and a source file in accordance with the general conversion rule 221 (see FIG. 9). A header file name is a name that is obtained by addition of an extension ".h" to the file name (except the extension) of the model diagram 200. A source file name is a name that is obtained by addition of an extension ".c" to the file name (except the extension) of the model diagram 200. In case where the file name of the model diagram 200 is "ExecBackup.mdl", the header file name is "ExecBackup.h" and the source file name is "ExecBackup.c". The name of a function described in the source file is "ExecBackup".

Subsequently, the code generation unit 140 describes a prototype declaration or the like in the header file.

Then the code generation unit 140 describes the program code in the source file based on the model diagram 200. The code generation unit 140 refers to the block conversion rule 222, the behavior conversion rule 223, and the branch information as appropriate.

In FIG. 12, a specific example of a header file 230 is illustrated.

A program code 231 is described in the header file 230.

The program code 231 is a code for definition of the prototype declaration or the like in relation to a function corresponding to the model diagram 200. The program code 231 is described in C language.

Figures 13, 14:
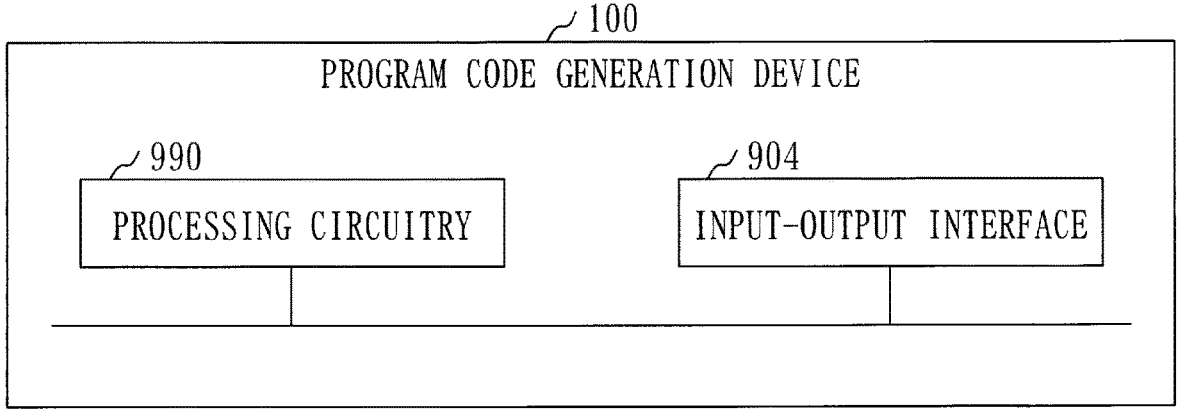
FIG. 13 is a diagram illustrating a specific example of a source file 240 in Embodiment 1.
FIG. 14 is a hardware configuration diagram of the program code generation device 100 in Embodiment 1.

In FIG. 13, a specific example of a source file 240 is illustrated.

A program code 241 is described in the source file 240.

The program code 241 is a code of the function corresponding to the model diagram 200. The program code 241 is described in C language.

A portion enclosed by a dashed line includes codes corresponding to the branch element and the branch destination groups. The branch condition "result==1" in the model diagram 200 (see FIG. 3) has been modified into the conditional statement "result!=1". Behind the codes corresponding to the second branch destination group (B4 and B7), the codes corresponding to the first branch destination group (B5, B6, and B8) are described.

Effects of Embodiment 1

The program code generation device 100 identifies the branch destination groups from the model diagram 200 and generates the program code so that more important branch destination groups among the identified branch destination groups may be located rearward. As a result, the program code that resists being adversely affected by fault injection attacks which cause skips over instructions related to a control structure is generated.

Therefore, labor and time for investigation as to whether the program code is prone to be adversely affected by the fault injection attacks or not may be lessened. In addition, labor and time for modification to sites that are prone to be adversely affected by the fault injection attacks may be lessened.

Embodiment 2

In relation to an embodiment in which the sequence of the branch destination groups is determined in accordance with a predetermined sequence rule instead of the ascending order of the importance level, differences from Embodiment 1 will be chiefly described.

\*\*\*Description of Configuration\*\*\*

The configuration of the program code generation device 100 is the same as the configuration in Embodiment 1 (see FIG. 1).

\*\*\*Description of Operation\*\*\*

Figure 2:
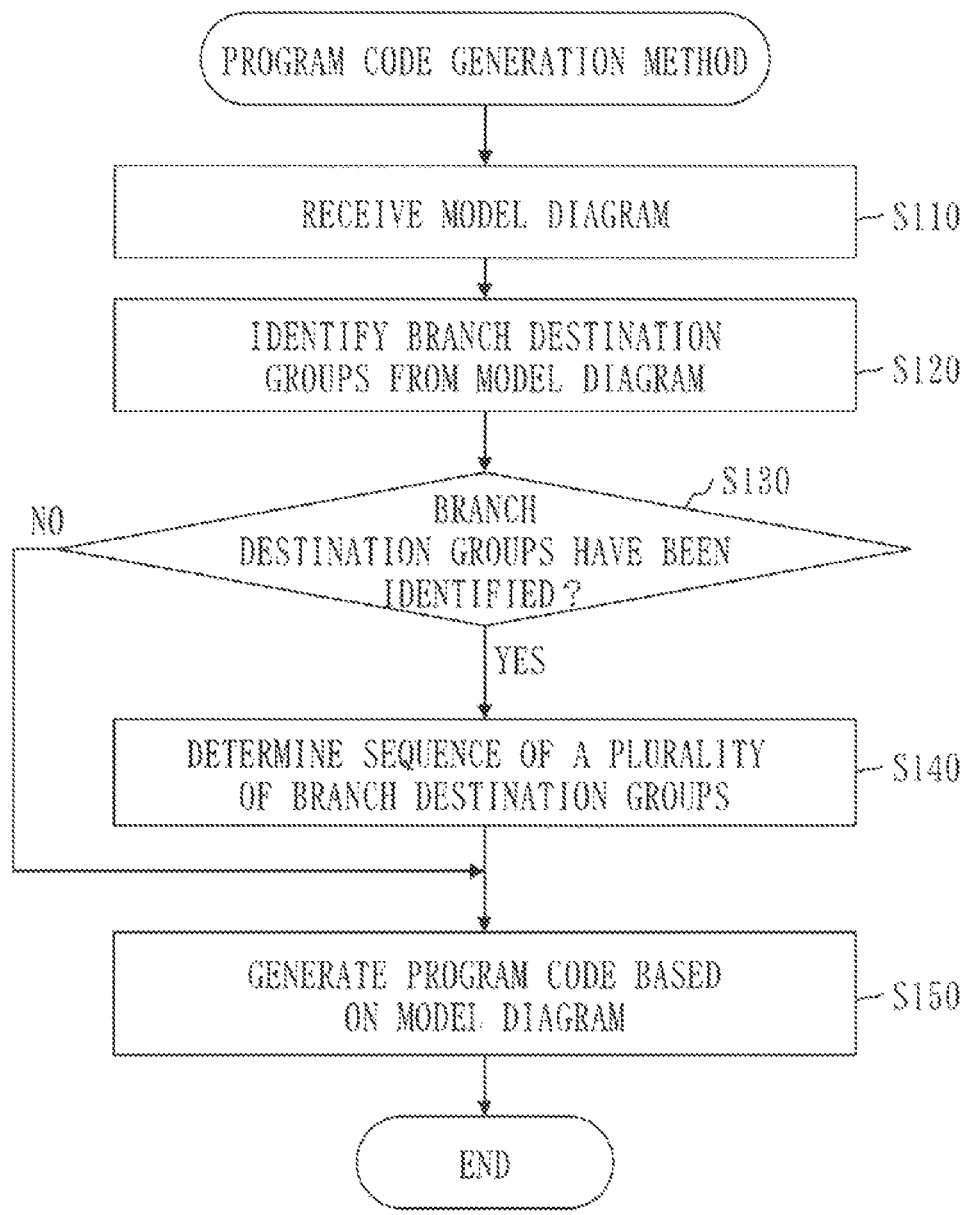
FIG. 2 is a flowchart illustrating a program code generation method in Embodiment 1.

The flow of the processes in the program code generation method is the same as the flow of the processes in Embodiment 1 (see FIG. 2).

A method of determining the sequence of the branch destination groups in step S140, however, differs from the method in Embodiment 1.

Based on FIG. 6, the sequence determination process (S140) will be described.

A flow of the sequence determination process (S140) is as described in relation to Embodiment 1.

The method of determining the sequence of the branch destination groups in step S146, however, differs from the method in Embodiment 1.

In step S146, the sequence determination unit 130 determines the sequence of the branch destination groups in accordance with the sequence rule. The sequence rule represents a relationship between the importance level and the sequence.

A plurality of sequence rules exist in accordance with development environments for the program or execution environments for the program and the plurality of sequence rules are stored in the storage unit 191 in advance.

For instance, a sequence rule may exist for each type of compiler. In this case, the sequence determination unit 130 selects a sequence rule corresponding to a compiler specified by a user and determines the sequence of the branch destination groups in accordance with the selected sequence rule.

A sequence rule may exist for each type of architecture, for instance. In this case, the sequence determination unit 130 selects a sequence rule corresponding to architecture specified by the user and determines the sequence of the branch destination groups in accordance with the selected sequence rule.

Effects of Embodiment 2

The program code generation device 100 appropriately determines the sequence of the branch destination groups in accordance with a development environment for the program or an execution environment for the program.

As a result, the program code that resists being adversely affected by the fault injection attacks which cause the skips over the instructions related to the control structure is generated.

Therefore, the labor and the time for the investigation as to whether the program code is prone to be adversely affected by the fault injection attacks or not may be lessened. In addition, the labor and time for the modification to sites that are prone to be adversely affected by the fault injection attacks may be lessened.

Embodiment 3

In relation to an embodiment in which the importance level of each branch destination group is determined based on a configuration of the program elements in the branch destination group instead of presence or absence of the important element, differences from Embodiment 1 will be chiefly described.

\*\*\*Description of Configuration\*\*\*

The configuration of the program code generation device 100 is the same as the configuration in Embodiment 1 (see FIG. 1).

\*\*\*Description of Operation\*\*\*

The flow of the processes in the program code generation method is the same as the flow of the processes in Embodiment 1 (see FIG. 2).

A method of determining the sequence of the branch destination groups in step S140, however, differs from the method in Embodiment 1.

Based on FIG. 6, the sequence determination process (S140) will be described.

The flow of the sequence determination process (S140) is as described in relation to Embodiment 1.

A method of determining the importance level of each branch destination group in step S143, however, differs from the method in Embodiment 1.

In step S143, the sequence determination unit 130 determines the importance level of the branch destination group based on the configuration of the program elements in the branch destination group.

For instance, the sequence determination unit 130 determines the importance level of the branch destination group based on the number of the program elements included in the branch destination group. The greater the number of the program elements is, the higher the importance level is.

The sequence determination unit 130 determines complexity of the configuration based on the program elements included in the branch destination group and determines the importance level of the branch destination group based on the complexity of the configuration, for instance. The higher the complexity is, the higher the importance level is.

Effects of Embodiment 3

It is unnecessary for a preparer of the model diagram 200 to select the important element from among the program elements included in the model diagram 200 and to set the important attribute for the important element.

Therefore, labor and time for preparation of the model diagram 200 may be lessened.

Embodiment 4

In relation to an embodiment in which the importance level of each branch destination group is determined based on contents of the program elements in the branch destination group, differences from Embodiment 1 will be chiefly described.

\*\*\*Description of Configuration\*\*\*

The configuration of the program code generation device 100 is the same as the configuration in Embodiment 1 (see FIG. 1).

\*\*\*Description of Operation\*\*\*

The flow of the processes in the program code generation method is the same as the flow of the processes in Embodiment 1 (see FIG. 2).

A method of determining the sequence of the branch destination groups in step S140, however, differs from the method in Embodiment 1.

Based on FIG. 6, the sequence determination process (S140) will be described.

The flow of the sequence determination process (S140) is as described in relation to Embodiment 1.

A method of determining the importance level of each branch destination group in step S143, however, differs from the method in Embodiment 1.

In step S143, the sequence determination unit 130 determines the importance level of the branch destination group based on the contents of the program elements in the branch destination group.

Specifically, importance information for identification of the important elements is stored in the storage unit 191 in advance. The sequence determination unit 130 determines the importance level of the branch destination group based on whether any important element identified by the importance information is included in the branch destination group or not. The method of determining the importance level of the branch destination group including any important element and the importance level of the branch destination group including no important element is the same as the method in Embodiment 1.

In case where the importance information is "ExecProgram", the important element in the model diagram 200 of FIG. 3 is the processing block B6. Therefore, the first branch destination group (B5, B6, and B8) includes the important element. By contrast, the second branch destination group (B4 and B7) does not include the important element.

Effects of Embodiment 4

It is unnecessary for the preparer of the model diagram 200 to select the important element from among the program elements included in the model diagram 200 and to set the important attribute for the important element.

Therefore, the labor and the time for the preparation of the model diagram 200 may be lessened.

Embodiment 5

In relation to an embodiment in which the user is informed of a site in the model diagram 200 where the sequence is modified, differences from Embodiment 1 will be chiefly described.

*Description of Configuration*

The configuration of the program code generation device 100 is the same as the configuration in Embodiment 1 (see FIG. 1).

*Description of Operation*

The flow of the processes in the program code generation method is the same as the flow of the processes in Embodiment 1 (see FIG. 2).

In step S140, however, the user is informed of the site in the model diagram 200 where the sequence is modified.

Based on FIG. 6, the sequence determination process (S140) will be described.

The flow of the sequence determination process (S140) is as described in relation to Embodiment 1.

In step S147, however, the user is informed of the site in the model diagram 200 where the sequence is modified.

In step S147, in case where the determined sequence differs from the sequence identified by the branch element, the sequence determination unit 130 modifies the branch element so as to bring about the coincidence with the determined sequence. A method of modifying the branch element is as described in relation to Embodiment 1.

In case where the determined sequence differs from the sequence identified by the branch element, the sequence determination unit 130 modifies the model diagram 200 into a state in which the branch element is highlighted. Then the output unit 193 displays the model diagram 200 in the state in which the branch element is highlighted, on the display.

Effects of Embodiment 5

Thus it is made possible for the user to know the site where the sequence has been modified, without investigation on the program code.

Supplementation to Embodiments

Based on FIG. 14, a hardware configuration of the program code generation device 100 will be described.

The program code generation device 100 includes a processing circuitry 990.

The processing circuitry 990 is hardware that implements the branch element identification unit 110, the group identification unit 120, the sequence determination unit 130, and the code generation unit 140.

The processing circuitry 990 may be dedicated hardware or the processor 901 that executes a program stored in the memory 902.

In case where the processing circuitry 990 is the dedicated hardware, the processing circuitry 990 may be a single circuit, a composite circuit, a programmed processor, a parallelly programmed processor, an ASIC, an FPGA, or a combination thereof, for instance.

ASIC is an abbreviation for Application Specific Integrated Circuit and FPGA is an abbreviation for Field Programmable Gate Array.

The program code generation device 100 may include a plurality of processing circuits that substitute for the processing circuitry 990. Roles of the processing circuitry 990 are divided among the plurality of processing circuits.

Among functions of the program code generation device 100, some may be implemented by dedicated hardware and the remainder may be implemented by software or firmware.

Thus the processing circuitry 990 may be implemented by hardware, software, firmware, or a combination thereof.

The embodiments exemplify preferred embodiments and are not intended to confine the technical scope of the invention. The embodiments may be partially implemented or may be implemented in combination with other embodiments. The procedures described with use of the flowcharts or the like may be modified appropriately.

REFERENCE SIGNS LIST

100: program code generation device; 110: branch element identification unit; 120: group identification unit; 130: sequence determination unit; 140: code generation unit; 191: storage unit; 192: reception unit; 193: output unit; 200: model diagram; 210: branch element rule; 220: code conversion rule: 221: general conversion rule; 222: block conversion rule: behavior conversion rule; 230: header file; 231: program code; 240: source file; 241:program code; 901: processor; 902: memory; 903: auxiliary storage device; 904: input-output interface; 990: processing circuitry

The invention claimed is:

1. A program code generation device to automatically generate source code for a program, the program code generation device comprising:
 processing circuitry,
  to identify a branch element being a program element for branching, from a model diagram graphically representing a plurality of program elements and a relationship among the program elements, which are to be translated into source code for the program in accordance with a code conversion rule stored in a storage unit, to identify a branch destination group, the branch destination group being a series of program elements constituting branch destination of the branch element, for each branch destination from the model diagram, to determine a sequence of the branch destination groups in the source code for the program, and to automatically generate the source code for the program based on the model diagram and the determined sequence.

2. The program code generation device according to claim 1, wherein
the processing circuitry identifies the branch element based on types of the program elements.

3. The program code generation device according to claim 2, wherein
the processing circuitry determines, with use of a branch element rule specifying the type of the branch element, that a program element which falls under a type specified by the branch element rule is the branch element.

4. The program code generation device according to claim 1, wherein
the processing circuitry determines an importance level of each branch destination group based on whether the branch destination group includes a program element having an important attribute or not and determines the sequence of the branch destination groups based on the importance levels of the branch destination groups.

5. The program code generation device according to claim 4, wherein
the processing circuitry determines the sequence in ascending order of the importance level.

6. The program code generation device according to claim 4, wherein
the processing circuitry determines the sequence in accordance with a sequence rule specifying a relationship between the importance levels and the sequence.

7. The program code generation device according to claim 6, wherein
in case where the determined sequence differs from the sequence identified by the branch element, the processing circuitry modifies the branch element so as to bring about coincidence with the determined sequence.

8. The program code generation device according to claim 1, wherein
the processing circuitry determines an importance level of each branch destination group based on a configuration of the program elements in the branch destination group and determines the sequence of the branch destination groups based on the importance levels of the branch destination groups.

9. The program code generation device according to claim 8, wherein
the processing circuitry determines the sequence in ascending order of the importance level.

10. The program code generation device according to claim 8, wherein
the processing circuitry determines the sequence in accordance with a sequence rule specifying a relationship between the importance levels and the sequence.

11. The program code generation device according to claim 8, wherein
in case where the determined sequence differs from the sequence identified by the branch element, the processing circuitry modifies the branch element so as to bring about coincidence with the determined sequence.

12. The program code generation device according to claim 1, wherein
the processing circuitry determines an importance level of each branch destination group based on contents of the program elements in the branch destination group and determines the sequence of the branch destination groups based on the importance levels of the branch destination groups.

13. The program code generation device according to claim 12, wherein
the processing circuitry determines the sequence in ascending order of the importance level.

14. The program code generation device according to claim 12, wherein
the processing circuitry determines the sequence in accordance with a sequence rule specifying a relationship between the importance levels and the sequence.

15. The program code generation device according to claim 12, wherein
in case where the determined sequence differs from the sequence identified by the branch element, the processing circuitry modifies the branch element so as to bring about coincidence with the determined sequence.

16. The program code generation device according to claim 1, wherein
the source code of the program includes codes corresponding to the branch destination groups in accordance with the sequence of the branch destination groups.

17. The program code generation device according to claim 1, comprising:
an input-output interface to display the model diagram in a state in which the branch element is highlighted, in case where the determined sequence differs from the sequence identified by the branch element.

18. A non-transitory computer readable medium storing a program code generation program to automatically generate source code for a program, the program code generation program that causes a computer to execute:

a branch element identification process of identifying a branch element being a program element for branching, from a model diagram graphically representing a plurality of program elements and a relationship among the program elements, which are to be translated into source code for the program in accordance with a code conversion rule stored in a storage unit;

a group identification process of identifying a branch destination group, the branch destination group being a series of program elements constituting branch destination of the branch element, for each branch destination from the model diagram;

a sequence determination process of determining a sequence of the branch destination groups in the source code for the program code; and a source code generation process of automatically generating the source code for the program based on the model diagram and the determined sequence.

* * * * *